United States Patent

Sakai et al.

[11] Patent Number: 5,538,593
[45] Date of Patent: Jul. 23, 1996

[54] THIN FILM FLOW-DOWN TYPE CONCENTRATING APPARATUS

[75] Inventors: Yoshiharu Sakai, Nara; Kenzo Masutani, Osaka, both of Japan

[73] Assignee: Hisaka Works Limited, Osaka, Japan

[21] Appl. No.: 975,578

[22] PCT Filed: Jun. 27, 1991

[86] PCT No.: PCT/JP91/00877

§ 371 Date: Feb. 9, 1993

§ 102(e) Date: Feb. 9, 1993

[51] Int. Cl.⁶ .............. B01D 1/22; B01D 1/26; F28F 13/08

[52] U.S. Cl. .............. 159/13.1; 159/17.1; 159/28.6; 159/46; 159/49; 159/DIG. 8; 159/ 16.3; 165/147; 165/167; 202/172; 202/174

[58] Field of Search .................. 159/17.1, 13.1, 159/28.6, DIG. 8, 16.3, 46, 49, 27.4; 202/174, 172, 236, 235, 197; 165/166, 167, 146, 147; 203/10, 71, 89

[56] References Cited

U.S. PATENT DOCUMENTS

| 3,371,709 | 3/1968 | Rosenblod | 159/28.6 |
|---|---|---|---|
| 3,735,793 | 5/1973 | Burberry et al. | 159/28.6 |
| 3,840,070 | 10/1974 | Becker et al. | 159/28.6 |
| 3,984,281 | 10/1976 | Buchwald | 165/167 |
| 4,572,766 | 2/1986 | Dimitriou | 165/166 |
| 4,586,565 | 5/1986 | Hallström et al. | 159/13.2 |
| 4,978,429 | 12/1990 | Sears et al. | 159/28.6 |
| 5,098,518 | 3/1992 | Rakai et al. | 159/28.6 |
| 5,203,406 | 4/1993 | Blomgren et al. | 159/28.6 |
| 5,316,628 | 5/1994 | Collin et al. | 159/28.6 |

FOREIGN PATENT DOCUMENTS

| 6781772 | 9/1966 | Belgium . |
|---|---|---|
| 0411123 | 2/1991 | European Pat. Off. . |
| 1084292 | 9/1966 | United Kingdom . |
| 2089226 | 6/1982 | United Kingdom . |
| 2089666 | 6/1982 | United Kingdom . |

*Primary Examiner*—Virginia Manoharan
*Attorney, Agent, or Firm*—Nikaido, Marmelstein, Murray & Oram

[57] ABSTRACT

A thin film flow-down type concentrating apparatus for concentrating a heat susceptible raw liquid with heated steam to high concentration without spoiling the flavor or deteriorating the quality by alternately laminating raw liquid plates and steam plates 20, in which the width of the raw liquid heating passage 18 is gradually narrowed from the raw liquid inlet to the concentrate outlet. As a result, if the volume of the raw liquid decreases due to evaporation and separation of the moisture in the raw liquid, scorching is prevented. Besides, by the steam generated from the raw liquid, in order to prevent increase of the flow velocity of the concentrate going toward the concentrate exit, the plate intervals of the raw liquid heating passage is gradually widened from the raw liquid inlet toward the concentrate outlet.

7 Claims, 4 Drawing Sheets

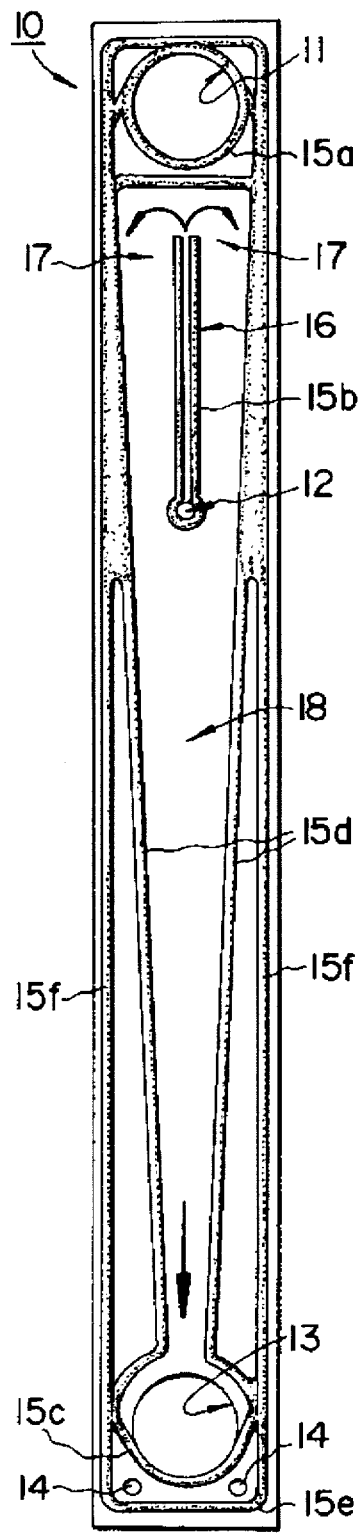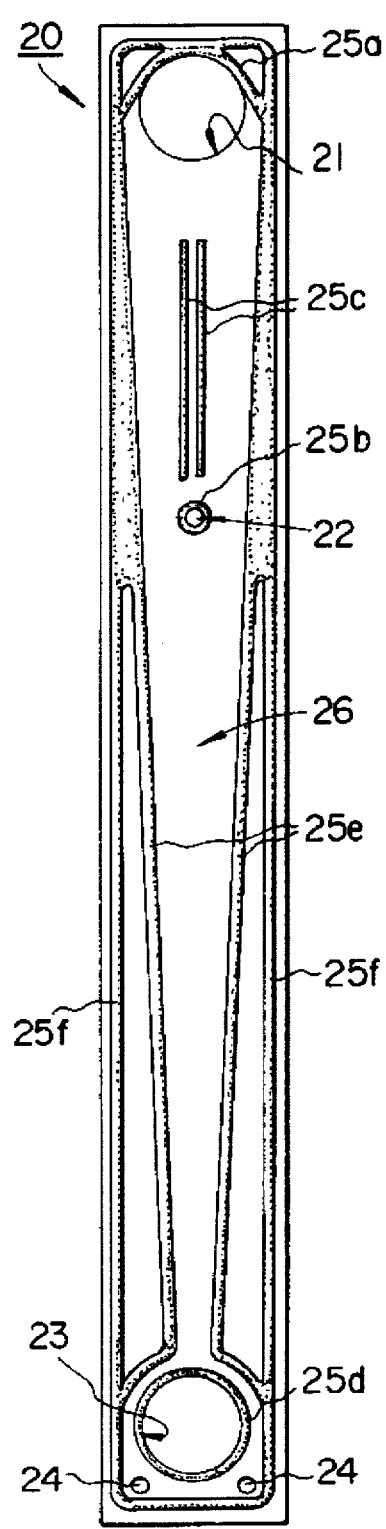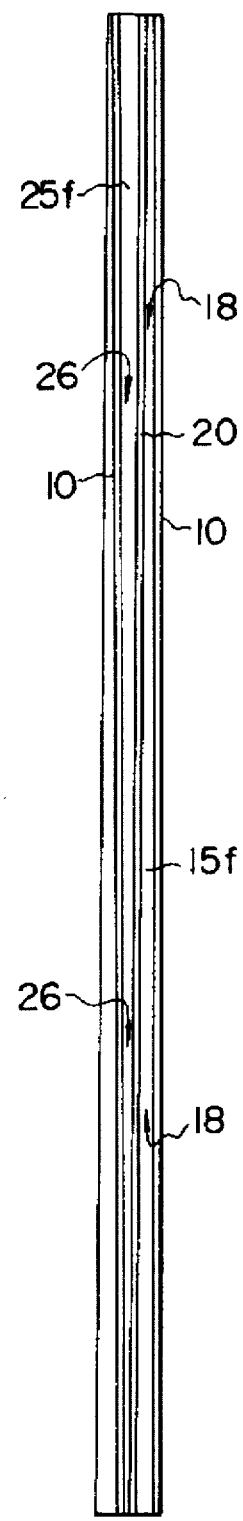

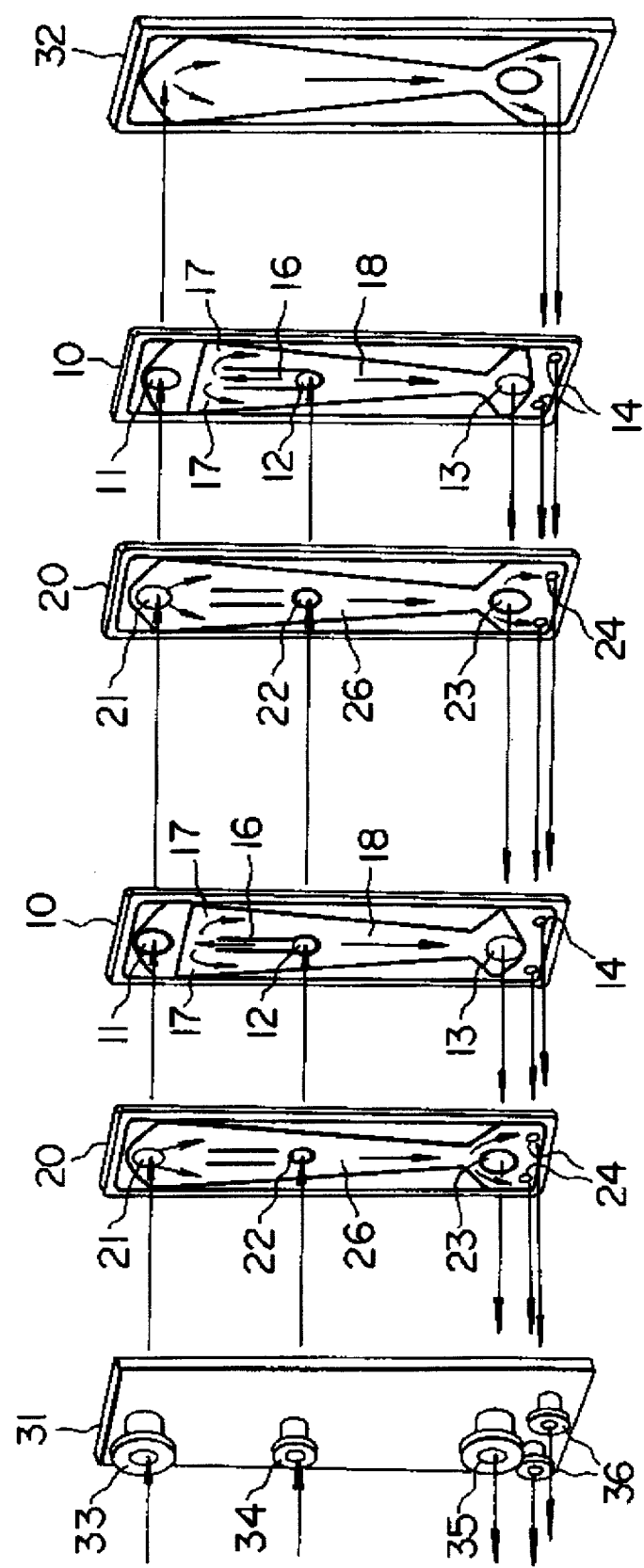

THIN FILM FLOW-DOWN TYPE CONCENTRATING APPARATUS

FIELD OF THE INVENTION

The present invention relates to a thin film flow-down type concentrating machine, and more particularly to a machine for concentrating a raw liquid which is required to be concentrated to a high degree without sacrificing the flavor or deteriorating the quality, such as heat susceptible liquid including fruits (orange, pineapple, tangerine, etc. ), vegetables (onion, tomato, etc. ), livestock extract (chicken, beef, pork, etc.), and marine products (shrimp, oyster, fish, crab, etc.).

PRIOR ART

When concentrating a heat susceptible liquid, it is necessary to shorten the heat contact time with the steam heating element. It is accordingly desired to take out the raw liquid supplied into the concentrating equipment as a concentrate liquid by one pass. The present inventors previously developed a thin film flow-down type concentrating machine favorable for concentrating a heat susceptible liquid, and internationally applied as W090/09220.

This application had, however, a room for improvement concerning the concentration of the raw liquid that requires a higher degree of concentration. That is, when concentrating a raw liquid to a high degree, a multistep concentration method is employed, and the moisture in the raw liquid is evaporated and removed in steps by the concentrating equipment, and the concentration becomes higher and the liquid volume of the raw liquid decreases in the later steps, and the liquid volume becomes extremely small in the final step, and a dry portion appears on the heating surface, which has sometimes led to scorching or deterioration of quality. As this countermeasure, it may be considered to recycle a part of the concentrate to increase the liquid volume only at the final step, but in such a case the flavor is sacrificed in the case of heat susceptible liquid and the quality is lowered, and the concentration efficiency is also decreased.

The invention is intended to improve these points, and it is a primary object thereof to present a thin film flow-down type concentration machine capable of concentrating to a high degree perfectly by one pass.

SUMMARY OF THE INVENTION

To achieve the above object, the invention presents a thin film flow-down type concentrating machine for concentrating a raw liquid by heated steam by alternately laminating raw liquid plates and steam plates, in which the width of the heating path of raw liquid from the entrance of raw liquid till the exit of concentrate is gradually narrowed.

It is also a feature of the invention, aside from the above constitution, that the plate intervals are gradually widened from the entrance of raw liquid to the exit of concentrate.

Also in the invention, the plate intervals are gradually narrowed from the entrance of raw liquid to the exit of concentrate, and the width of raw liquid heating path is uniform from the entrance of raw liquid to the exit of concentrate.

Furthermore in the invention, the width of the raw liquid heating path from the entrance of raw liquid to the exit of concentrate is gradually narrowed, and an evaporated steam path is formed by the side of the heating path from an intermediate point of the heating path to the exit of concentrate. These and other features of the invention are better understood and appreciated from the following detailed description taken in conjunction with the accompanying drawings.

BRIEF DESCRIPTION OF THE DRAWINGS

FIG. 1 is a front view of a raw liquid plate of the invention;

FIG. 2 is a front view of a steam plate of the invention;

FIG. 3 is a perspective exploded view showing schematically the constitution of a concentrating machine formed by alternately laminating raw liquid plates and steam plates according to the invention;

FIG. 4 is a side view of essential parts of arrangement state of plates showing a second embodiment of the invention;

DESCRIPTION OF THE PREFERRED EMBODIMENTS

Figure 5:
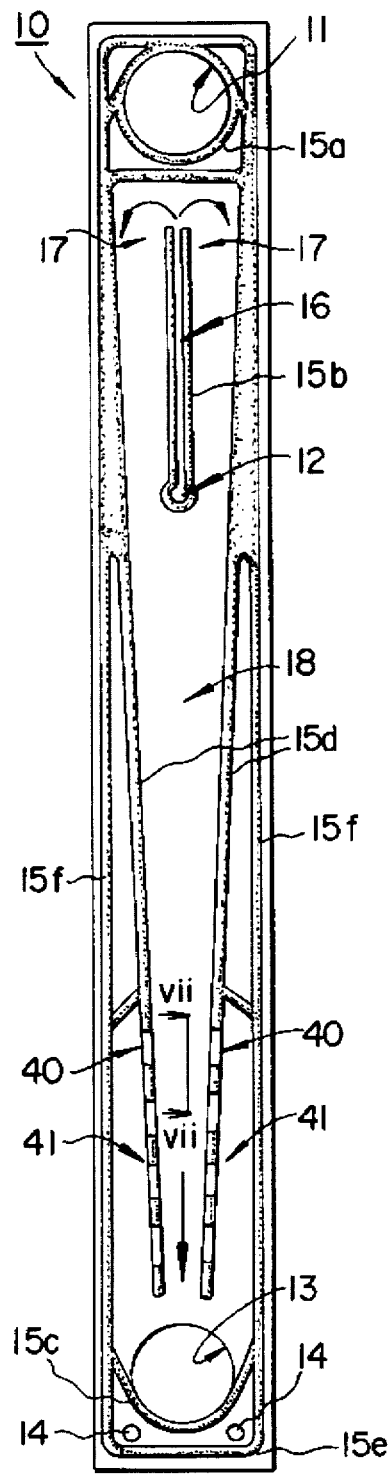
FIG. 5 is a front view of a raw liquid plate in a fourth embodiment of the invention.

In FIG. 1, numeral 10 denotes a raw liquid plate of the invention, which comprises a heated steam passage 11, raw liquid inlet 12, concentrate outlet 13, and drain passages 14, 14.

The heated steam passage 11 has an opening formed in the upper middle part of the raw liquid plate 10, and is surrounded with a gasket 15a.

The raw liquid inlet 12 is opened slightly above the middle of the vertical direction of the raw liquid plate 10 on the central line in the widthwise direction of the raw liquid plate 10, and it is about ⅕ to ⅙ of the width of the raw liquid plate 10, and is surrounded with a gasket 15b of nearly U-form. This U-form gasket 15b composes a preheating passage 16 of the raw liquid entering from the raw liquid inlet 12, and is designed to uniformly disperse the raw liquid from its upper opening to the dispersion parts 17, 17 at both sides.

The concentrate outlet 13 is opened in the lower middle part of the raw liquid plate 10, and its lower circumference is surrounded with a gasket 15c of nearly U-form.

From above the raw liquid preheating passage 16 till the concentrate outlet 13 through the dispersion parts 17, 17 at both sides, a heating passage 18 for raw liquid is formed. This heating passage 18 is surrounded with a gasket 15d, and the lower end of this gasket 15d is consecutive to the U-form gasket 15c surrounding the lower circumference of the concentrate outlet 13.

The heating passage 18 is gradually narrowed in the width from the raw liquid inlet 12 toward the concentrate outlet 13. Accordingly, the gasket 15d surrounding the heating passage 18 is narrowed in the widthwise interval downward.

The drain passages 14, 14 are opened at both sides beneath the raw liquid plate 10 at a lower position than the concentrate outlet 13, and they are surrounded with gaskets 15e.

The circumference of the raw liquid plate 10 is surrounded with a frame-shaped gasket 15f, and this frame-shaped gasket 15f is formed in series with other gaskets 15a, 15c, 15d, 15e.

In FIG. 2, numeral 20 denotes a steam plate, which comprises heated steam inlet 21, raw liquid passage 22, concentrate passage 23, and drain outlets 24, 24.

The heated steam inlet 21 is opened in the middle of the upper part of the steam plate 20, and its upper half is surrounded with a gasket 25a.

The raw liquid passage 22 is opened slightly above the middle of the vertical direction of the steam plate 20 on the central line of the lateral direction of the steam plate 20, and is ⅕ to ⅙ of the size of the lateral direction of the steam plate 20, and it is surrounded with an annular gasket 25b. Also above the raw liquid passage 22, there is affixed a gasket 25c for preventing the plates 10, 20 from deflecting or deforming, correspondingly to the gasket 15b for composing the raw liquid preheating passage 16 of the raw liquid plate 10.

The concentrate passage 23 is opened in the middle of the lower part of the steam plate 20, and is surrounded with an annular gasket 25d.

The drain outlets 24, 24 are opened at both sides of the lower part of the steam plate 20 at a lower position than the concentrate passage 23. The drain outlets 24, 24 are surrounded with a series of frame-shaped gaskets 25e including the heated steam passage 26 in which the heated steam flowing in from the heated steam inlet 21 above the steam plate 20 flows down toward the drain outlets 24, 24.

The heated steam passage 26 is gradually narrowed in the width from the upper part to the lower part of the raw liquid plate 10. Accordingly, the gasket 25e surrounding the heated steam passage 26 is narrowed in the interval in the widthwise direction downward.

The steam plate 20 is surrounded with a frame-shaped gasket 25f, and this frame-shaped gasket 25f is formed in series with the gasket 25e surrounding the heated steam passage 26.

The position and size of the heated steam inlet 21, raw liquid passage 22, concentrate passage 23, and drain outlets 24, 24 of the steam plate 20 are matched with the position and size of the heated steam passage 11, raw liquid inlet 12, concentrate outlet 13, and drain passages 14, 14 of the raw liquid plate 10.

A first embodiment of the invention composes a thin film flow-down type concentrating machine by alternately laminating thus composed raw liquid plate 10 and steam plate 20 as shown in FIG. 2, and disposing end plates 31, 32 at both ends.

Heated steam is supplied from a heated steam feed port 33 above one end plate 31, and raw liquid is supplied from a raw liquid feed port 34 slightly above the middle in the vertical direction. In consequence, the raw liquid climbs up the preheating passage 16 from the raw liquid-inlet 12 of each raw liquid plate 10, and flows down in a thin film along the raw liquid heating passage 18 by way of the dispersion parts 17, 17 at both sides from above, and is discharged from the concentrate outlet 13. On the other hand, the heated steam flows down in a thin film from the heated steam inlet 21 of each steam plate 3 along the heated steam passage 26, and is discharged from the drain outlets 24, 24.

As a result, the raw liquid is preheated in the preheating passage 16 of each raw liquid plate 10 by the heated steam running at both sides, and is heated in the heating passage 18 to be concentrated, and is discharged from the concentrate outlet 13.

In the process of concentration of the raw liquid, the moisture in the raw liquid is evaporated as steam, and the liquid volume decreases accordingly, and if the width of the heating passage 18 of the raw liquid is uniform from top to bottom, a dry area may be formed on the heating surface, but in the invention since the width of the heating passage 18 of the raw liquid is gradually narrowed from top to bottom, the heating surface is prevented from forming a dry area.

On the other hand, the heated steam runs through the heated steam passage 26 of each steam plate 20, and heats the raw liquid running at both sides to condense, and is finally discharged as drain through the drain outlets 24, 24.

Since the heated steam is condensed to decrease in volume, the heated steam passage 26 is also desired to be gradually narrowed in width downward.

In FIG. 3, numeral 35 is a concentrate take-out port, and 36 is a drain take-out port.

A second embodiment of the invention is described below while referring to FIG. 4.

The second embodiment is realized by combining with the embodiment in FIGS. 1 to 3. That is, in the embodiment in FIGS. 1 to 3, the raw liquid flows down the heating passage 18 in a thin film to be concentrated to decrease the liquid volume, and by narrowing the width of the heating passage 18 corresponding to this decrease, forming of dry area on the heating surface is prevented, but in the concentration process of the raw liquid, as the moisture in the raw liquid is evaporated to become steam and flows down toward the concentrate outlet 13 together with the concentrate, and the volume of the evaporated steam is increased from the original moisture volume, and therefore the flow velocity of the concentrate toward the concentrate outlet 13 may be excessive, so that a sufficient heating time may not be maintained.

To prevent this, in the second embodiment, as shown in FIG. 4, the plate intervals of the heating passage 18 of raw liquid formed between the raw liquid plates 10 and steam plates 20 are gradually widened from top to bottom. By so setting up, it is intended to prevent the flow velocity of the concentrate toward the concentrate outlet 13 from becoming excessive due to the evaporated steam generated in the process of concentration of the raw liquid.

As the means of realizing this constitution, the thickness of the gaskets 15a to 15f of the raw liquid plate 10 is gradually increased from top to bottom as shown in FIG. 4. Along with this, the thickness of the gaskets 25a to 25f of the steam plate 20 is gradually reduced from top to bottom as shown in FIG. 4. As a result, the entire thickness of the laminate structure of the raw liquid plates 10 and steam plates 20 becomes uniform. In this constitution, since the heated steam flows down from top to bottom and is condensed to decrease in volume, no problem should occur.

A third embodiment of the invention is described below.

The third embodiment is not illustrated, but is composed as follows.

The plate intervals composing the heating passage 18 of raw liquid are gradually narrowed from the raw liquid inlet 12 toward the concentrate outlet 13, and the width of the heating passage 18 of raw liquid is unchanged from the raw liquid inlet 12 to the concentrate outlet 13.

By so composing the heating passage, the liquid flowing down the heating passage 18 of raw liquid is concentrated to a decrease in liquid volume, since the plate intervals for composing the heating passage 18 of the raw liquid are narrower at the lower side, the formation of dry areas on the heating surface may be prevented. Along with this, the plate intervals of the heating steam passage 26 is set wider downward. The width of the heating steam passage 26 is uniform from top to bottom.

Figure 6:
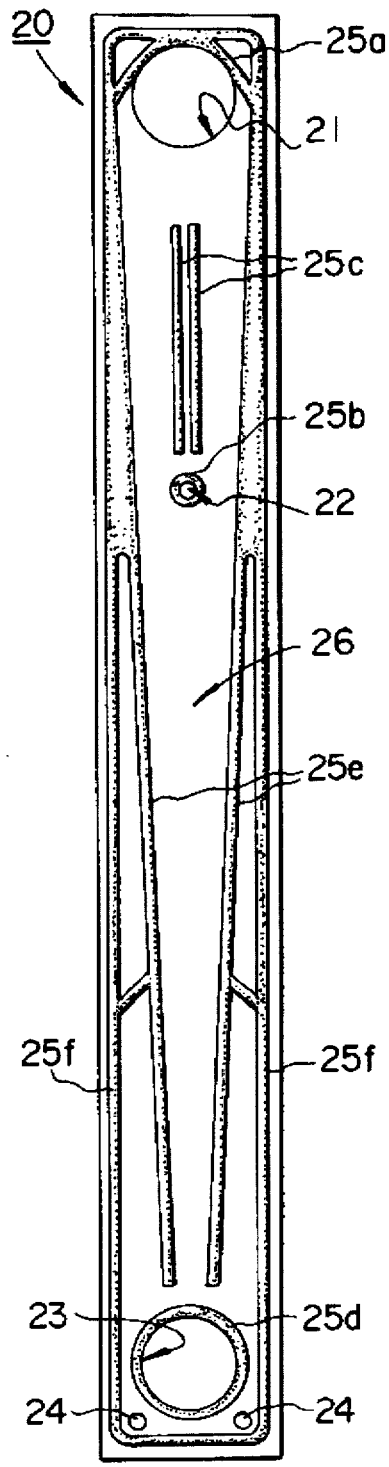
FIG. 6 is a front view of a steam plate in a fourth embodiment of the invention.
Figure 7:
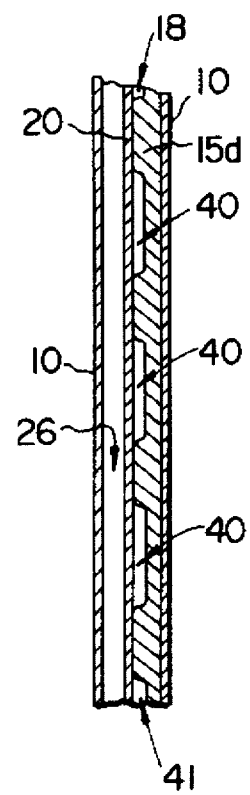
FIG. 7 is a magnified sectional view of line vii—vii of FIG. 5.

A fourth embodiment of the invention is described while referring to FIGS. 5 to 7.

FIG. 5 shows a plate which is similar to the raw liquid plate 10 in FIG. 1, and same members are identified with the same reference numbers and are not further explained herein. What differs is that a plurality of evaporated steam outlets 40 are formed beneath the gasket 15d surrounding the heating passage 18 of raw liquid, and that an evaporated steam passage 41 is formed beneath either both sides or one side of the heating passage 18 of raw liquid. This evaporated steam passage 41 communicates with the concentrate outlet 13.

As shown in FIG. 5, the plurality of evaporated steam outlets 40 are formed beneath the gasket 15d surrounding the heating passage 18 of raw liquid, and the evaporated steam passage 41 is formed beneath either both sides or one side of the heating passage 18 of the raw liquid, in which the evaporated steam, generated when the raw liquid is concentrated to reduce its liquid volume, may be separated through the plurality of the evaporated steam outlets 40 into the evaporated steam passage 41 beneath either both sides or one side of the heating passage 18 of raw liquid, so that the flow velocity of the concentrate is prevented from increasing. FIG. 7 is a magnified side view showing the forming state of the plurality of evaporated steam outlets 40 disposed beneath the gasket 15d, in which the gasket 15d is indicated by hatching.

A corresponding steam plate 20 is shown in FIG. 6, and it is similar to the steam plate 20 shown in FIG. 2. The same members are identified with same reference numbers and are not further explained herein. The different point is that a part of the lower side of the gasket 25e surrounding the heated steam passage 26 is cut off to be formed in the same shape as the gasket 15f in FIG. 5. The action of the heated steam in this construction is not different from that in FIG. 2.

According to the fourth embodiment, gaskets of uniform thickness may be used, without having to vary the thickness of gaskets as in the second embodiment.

In the foregoing raw liquid plates 10 and steam plates 20, the slender ratio is about 9:1.

Figure 8:
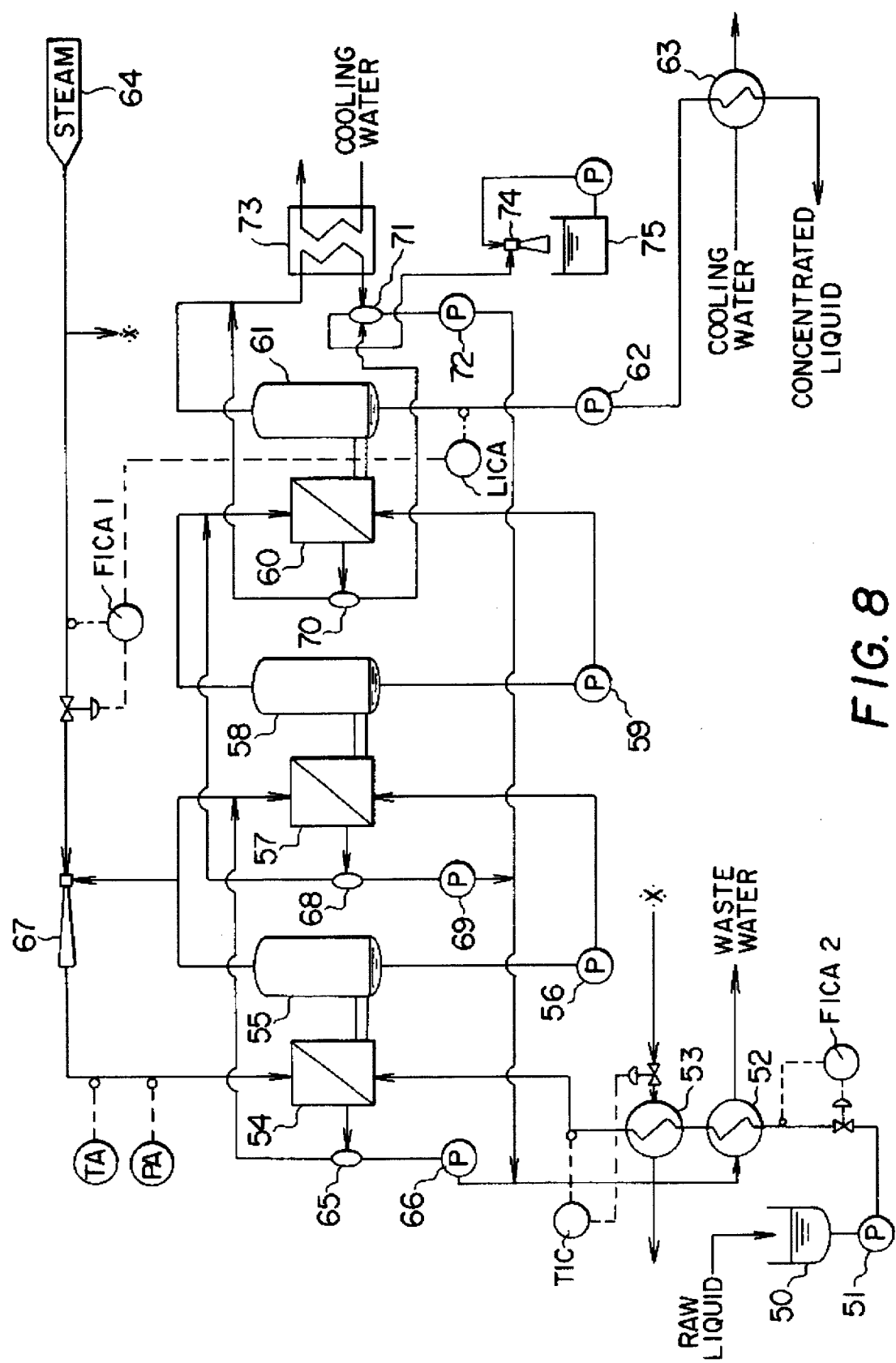
FIG. 8 is a flow sheet showing an example of concentrating equipment using heating plates of the invention.

FIG. 8 is a flow sheet of a concentrating process using the heating plates of the invention, in which the raw liquid is fed from a tank 50 into a first concentrating machine 54 by a first pump 51 through a first preheater 52 and a second preheater 53, and is concentrated, and separated into gas and liquid by a first separator 55. The concentrate separated from the gas by the first separator 55 is supplied into a second concentrating machine 57 through a second pump 56 to be further concentrated, and separated into gas and liquid by a second separator 58. The concentrate separated from the gas by the second separator 58 is then supplied into a third concentrating machine 60 through a third pump 59 to be concentrated more, and separated into gas and liquid by a third separator. The concentrate separated from the gas by the third separator 61 is sent into a cooler 63 by a fourth pump 62, and is cooled and taken out.

On the other hand, the heated steam is supplied from a supply source 64 into the first concentrating machine 54 and a second preheater 53. The drain of the heated steam of the first concentrating machine 54 is separated into uncondensed steam and condensed drain by the first drain separator 65. The condensed drain is supplied into the first preheater 52 as preheat source through a first drain pump, and is then discharged. The uncondensed steam is supplied into the second concentrating machine 57 as the heated steam, together with the separated steam from the first separator 55. A part of the separated steam from the first separator 55 is supplied into the first concentrating machine 54 together with the heated steam from the supply source 64 through a steam injector 67. The drain of the heated steam of the second concentrating machine 57 is separated into the uncondensed steam and condensed drain by a second drain separator 68. The drain of the heated steam of the third concentrating machine 60 is separated into the uncondensed steam and condensed drain by a third drain separator 70. The condensed drain is separated into the uncondensed steam and condensed drain by a fourth drain separator 71, and is supplied as preheat source into the first preheated 52 from a third drain pump 72, and is discharged. The uncondensed steam in the third drain separator 70 is supplied into a cooler 73 together with the separated steam from a third separator 61, and cooled, and is supplied into the fourth drain separator 71. In the fourth drain separator 71, being separated into the uncondensed steam and condensed drain, the condensed drain is supplied as preheat source into the first preheater 52 by the third drain pump 72 and is discharged. The uncondensed steam is supplied into a water tank 75 through a water injector 74.

FIG. 8 is an example of application of the invention in a three-step concentrating equipment, in which the heating source of the concentrating machine of the first step is an exclusive heat source, while the heat sources of the second and after concentrating machines may be the steam separated from the raw liquid of the preceding concentrating machine. In this case, the invention may be applied to all concentrating machines, or only to later concentrating machine(s).

What is claimed is:

1. An apparatus for concentrating a liquid by evaporation which comprises:

raw liquid inlet means for causing raw liquid to be evaporated to be fed to said apparatus;

concentrated liquid outlet means for causing concentrated liquid to exit said apparatus;

a multiplicity of downwardly converging liquid channel means, comprising heating plate means, each extending downwardly from said raw liquid inlet means to said concentrated liquid outlet means;

steam inlet means;

condensed steam outlet means;

a multiplicity of steam channel means, disposed proximate to and in operative association relationship with said multiplicity of liquid channel means, each comprising steam plate means extending downwardly from said steam inlet means to said condensed steam outlet means;

means for introducing raw liquid to be evaporated into an upper portion of said liquid channel means and to run downwardly along said heating plate means in a thin film wetting said heating plate means;

means for introducing steam into said steam channel means into operative relationship with said heating plate means on a side thereof opposite to said liquid channel means under conditions sufficient to heat said heating plate means sufficient to cause said liquid in said thin film to be concentrated by partial evaporation thereof to form vapor comprising steam and liquid concentrate;

passage means disposed on at least one side of said liquid channel means, extending from a point intermediate said raw liquid inlet means and said concentrated liquid outlet means, to a point proximate to said liquid outlet means;

means for causing said vapor to pass into said passage means;

means for causing said concentrated liquid and vapor to separately move down said liquid channel means to said concentrated liquid outlet means, and to both exit through said liquid concentrated outlet means together as separate phases;

guide means in said liquid channel means, including an inwardly directed wall of said passage means, disposed substantially normal to said heating plate means, converging in a downwardly direction from proximate to said raw liquid inlet to said concentrated liquid outlet an amount sufficient to reduce the volume of said liquid channel means proportional to the reduction in volume of said concentrating liquid caused by said concentration;

steam channel guide means substantially normal to said steam plate means converging from said steam inlet toward said steam condensate outlet; and means for causing said vapor to exit said apparatus.

2. An apparatus as claimed in claim 1 further comprising intervals between the steam channel means and the liquid channel means maintained by the interposition of gaskets of gradually varying thickness.

3. An apparatus as claimed in claim 2 wherein the intervals between the steam channel means are gradually varied in thickness in reverse relation to the intervals between the liquid channel means.

4. An apparatus as claimed in claim 2 wherein the gaskets surrounding the steam channel means and the guide means in the liquid channel means gradually narrow in a downward direction and are formed continuously with frame-shaped gaskets disposed along the outer circumference of the channel means.

5. An apparatus as claimed in claim 4 wherein said concentrated liquid outlet is formed in the gaskets surrounding the liquid channel means which is continuous with the frame-shaped gasket disposed along the outer circumference of the liquid channel means, and a plurality of steam outlets formed in the gaskets surrounding the liquid channel means which communicate with the concentrated liquid outlet.

6. An apparatus as claimed in claim 1, wherein said liquid channel means comprises a preheat section for first upwardly feeding the raw liquid along a generally central line of the longitudinal direction of the liquid channel means, means for dispersing raw liquid out of and to both sides of said preheat section, means for distributing said dispersed raw liquid in a substantially uniform thin film toward both sides of the liquid channel means, and means for allowing the raw liquid so dispersed to flow substantially uniformly downwardly through said liquid channel means in thin film.

7. An apparatus comprising a multiplicity of pairs of liquid channel means and steam channel means as claimed in claim 1 wherein each of said multiplicity of pairs constitutes a stage, and wherein said stages are disposed in alternating relationship with separators therebetween, including means for sending raw liquid from one stage to a later stage sequentially in one pass, means for using the separated steam from a former stage as the heating medium of a later concentrating stage in a multiple effect system, steam injector means for supplying heating medium to the first stage, and means for preheating raw liquid for said first stage by contacting said raw liquid with steam condensate.

\* \* \* \* \*